US008655862B1

(12) United States Patent
Riley et al.

(10) Patent No.: US 8,655,862 B1
(45) Date of Patent: Feb. 18, 2014

(54) SYSTEM AND METHOD FOR QUERY RE-ISSUE IN SEARCH ENGINES

(75) Inventors: Patrick Riley, Palo Alto, CA (US); Paul Komarek, Mountain View, CA (US); Vrishali Wagle, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 431 days.

(21) Appl. No.: 11/874,124

(22) Filed: Oct. 17, 2007

(51) Int. Cl.
*G06F 17/30* (2006.01)
*G06F 7/00* (2006.01)

(52) U.S. Cl.
USPC .......................................... 707/707; 707/722

(58) Field of Classification Search
USPC ...................... 707/3, 706, 707, 722
See application file for complete search history.

(56) References Cited

U.S. PATENT DOCUMENTS

| 5,701,464 | A  | * | 12/1997 | Aucsmith ............... 707/999.002 |
|---|---|---|---|---|
| 6,006,225 | A  | * | 12/1999 | Bowman et al. ....... 707/999.002 |
| 6,078,917 | A  | * | 6/2000 | Paulsen et al. ......... 707/999.005 |
| 6,594,654 | B1 | * | 7/2003 | Salam et al. ...................... 707/3 |
| 6,651,057 | B1 | * | 11/2003 | Jin et al. ................. 707/999.005 |
| 6,941,297 | B2 | * | 9/2005 | Carmel et al. ................ 707/765 |
| 7,158,969 | B2 | * | 1/2007 | Dettinger et al. ...................... 1/1 |
| 7,272,593 | B1 | * | 9/2007 | Castelli et al. .................... 707/3 |
| 7,472,119 | B2 | * | 12/2008 | Dai et al. ............... 707/999.002 |
| 7,519,581 | B2 | * | 4/2009 | Wang et al. ............ 707/999.003 |
| 7,526,470 | B1 | * | 4/2009 | Karnawat et al. ...... 707/999.002 |
| 7,548,908 | B2 | * | 6/2009 | Fu et al. ................. 707/999.003 |
| 7,565,345 | B2 | * | 7/2009 | Bailey et al. ........... 707/999.004 |
| 7,617,205 | B2 | * | 11/2009 | Bailey et al. ........... 707/999.002 |
| 7,702,683 | B1 | * | 4/2010 | Kirshenbaum ............... 707/758 |
| 7,756,855 | B2 | * | 7/2010 | Ismalon ....................... 707/713 |
| 7,890,526 | B1 | * | 2/2011 | Brewer et al. ................ 707/767 |
| 7,962,479 | B2 | * | 6/2011 | Jones et al. ................... 707/728 |
| 2004/0210443 | A1 | * | 10/2004 | Kuhn et al. .................... 704/276 |
| 2005/0213592 | A1 | * | 9/2005 | Kalish ........................... 370/401 |
| 2006/0167842 | A1 | * | 7/2006 | Watson ............................. 707/3 |
| 2006/0230035 | A1 | * | 10/2006 | Bailey et al. ..................... 707/5 |
| 2007/0005575 | A1 | * | 1/2007 | Dai et al. ......................... 707/3 |
| 2008/0082628 | A1 | * | 4/2008 | Rowstron et al. ............ 709/217 |
| 2009/0006358 | A1 | * | 1/2009 | Morris et al. ..................... 707/5 |

OTHER PUBLICATIONS

'Rollyo: About Rollyo', Rollyo [online], [retrieved on Jan. 16, 2008]. Retrieved from the Internet: <URL:rollyo.com/about.html>, 5 pages.

(Continued)

*Primary Examiner* — Pavan Mamillapalli
(74) *Attorney, Agent, or Firm* — Fish & Richardson P.C.

(57) ABSTRACT

A system embodiment receives a query from the user. The query is processed by a search infrastructure which may return a set of results. Results may then be estimated for quality by a quality estimator. The quality estimator may determine an initial quality estimation of the search result(s). A query re-issuer generates re-issued query information based on the initial quality estimation of the search result(s) for the initial query. A query modifier then receives the re-issued query information and generates a modified re-issued query in accordance with the query re-issue information. A method embodiment modifies and re-issues a query to the search infrastructure. The method includes determining an initial quality estimation of the search result, generating re-issued query information based on at least an initial quality estimation of the search result for the initial query, receiving the re-issued query information and generating a modified re-issued query in accordance with the re-issued query information.

19 Claims, 5 Drawing Sheets

(56) References Cited

OTHER PUBLICATIONS

'What is Yahoo! Search Builder ?', Yahoo! Help-Search [online], [retrieved on Jan. 16, 2008]. Retrieved from the Internet: <URL:help.yahoo.com/help/us/ysearch/searchbuilder/searchbuilder-01.html>, 1 page.

'About Search Macros', Windows Live Help [online], [retrieved on Jan. 16, 2008]. Retrieved from the Internet: <URL: help.live.com/help.aspx?project=wl_searchvl&market=en-US&querytype=keyword&query=sorcam&tmt=&domain=search.live.com##>, 2 pages.

* cited by examiner

SYSTEM AND METHOD FOR QUERY RE-ISSUE IN SEARCH ENGINES

BACKGROUND

1. Field of the Invention

The present invention relates in general to search engines.

2. Related Art

The development of information retrieval systems has predominantly focused on improving the overall quality of the search results presented to the user. The quality of the results has typically been measured in terms of accuracy, recall, or other quantifiable measures of performance. Information retrieval systems, or 'search engines' in the context of the Internet and World Wide Web, use different techniques to improve the quality and usefulness of the search results. These techniques may address certain aspects of search engine design, such as basic indexing algorithms and document representation.

An inherent problem in the design of search engines is that the relevance of search results to a particular user depends on factors that are highly dependent on the user's intent in conducting the search, that is, why they are conducting the search, as well as the user's circumstances and facts pertaining to the user's information need. Thus, given the same query by two different users, a given set of search results can be relevant to one user and irrelevant to another, entirely because of the different intent and information needs.

Most attempts at solving the problem of inferring a user's intent typically depend on relatively weak indicators, such as static user preferences, or predefined methods of query reformulation that are nothing more than educated guesses about what the user is interested in based on the query terms. Approaches such as these cannot fully capture user intent because such intent is itself highly variable and dependent on numerous situational facts that cannot be extrapolated from typical query terms.

In some cases, browsers may allow filtering of returned results to block undesired content (such as, parental web site blocking tools). Different browser tools have also been used to remove undesirable search terms in search queries prior to sending these terms to search engines. However these attempts have been designed to block content and may not evaluate or improve quality of search results.

Systems and methods are needed that improve the quality of results for users.

SUMMARY OF THE INVENTION

The present invention relates to systems and methods for modifying and re-issuing a user's query. A system embodiment receives a query from the user. The query is processed by a search infrastructure which may return a set of results. A quality estimator may determine an initial quality estimation of the search result(s). A query re-issuer generates re-issued query information based on the initial quality estimation of the search result(s) for the initial query. A query modifier then receives the re-issued query information and generates modified re-issued query(ies) in accordance with the re-issued query information.

A method embodiment modifies and re-issues a query to the search infrastructure. The method includes the steps of: (a) determining an initial quality estimation of the search result(s) (b) generating re-issued query information based on at least an initial quality estimation of the search result(s) for the initial query; and (c) receiving the re-issued query information and generating a modified re-issued query in accordance with the re-issued query information.

In another embodiment, the quality estimator may provide an indication to the query re-issuer that may be based on the number of search results retrieved from the search infrastructure. This indication may be used by the query re-issuer to generate re-issued query information. Re-issued query information may be used by the query modifier to generate modified re-issued query(ies).

In this way, the quality of search results in response to a user's query may be improved by estimating the quality of the search results.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE EMBODIMENTS

The present invention relates to systems and methods for modifying and re-issuing a user's query. In embodiments of this invention, quality of search results in response to a user's query may be improved.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "URL" used herein refers to a content address. URLs may address content, including, but not limited to web pages, stored across one or more networks, such as the Internet. In another example, a URL may be a path corresponding to a location of a locally stored file. These examples are illustrative and are not intended to limit the definition.

The term "query" refers to any information identifying a desired search. In one example, a query may include one or more terms.

The detailed description of the embodiments of the present invention is divided into several sections. The first section describes a query re-issue system according to an embodiment of the invention. The second section describes another embodiment of a query re-issue system. The third section describes a method according to an embodiment of this invention, which may be used in the operation of a query re-issue system.

System

Figure 1:
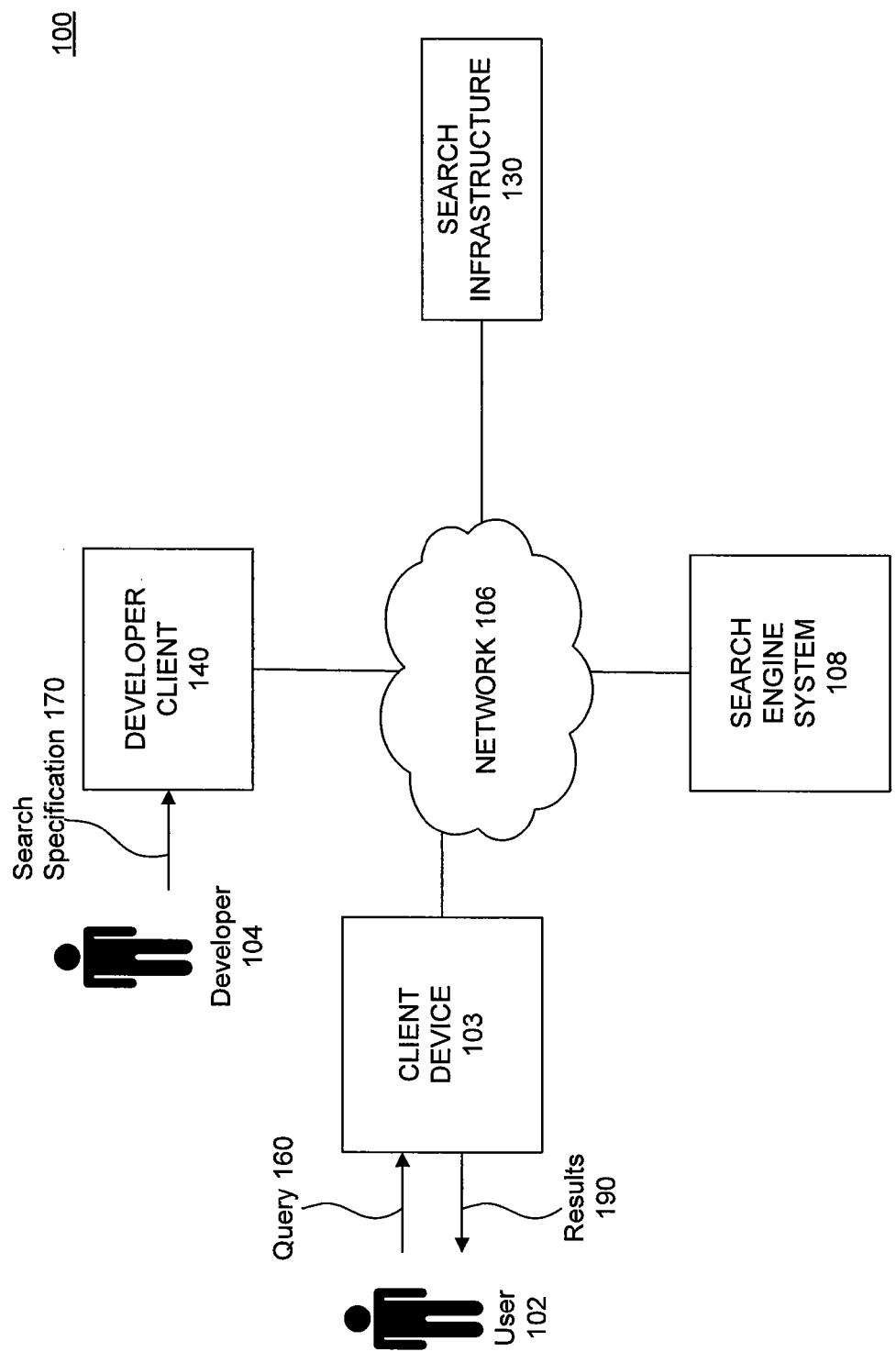
FIG. 1 is a diagram of a search engine system and associated search infrastructure according to an embodiment of the invention.

FIG. 1 is a diagram of system 100 illustrating a search engine system 108 with associated search infrastructure 130. Search engine system 108 can be coupled to a search infrastructure 130 through a network 106. User 102 can interact with a client device 103 coupled to network 106. Developer 104 can interact with a developer client device 140 coupled to network 106.

Network 106 may include one or more networks, including but not limited to, a local area network, medium-area network, and/or wide-area network, such as, the Internet.

Client device 103 and developer client 140 can each be any type of client device. For instance, client device 103 and developer client 140 can each be implemented on any type of processing device or combination of devices, including but not limited to, a computer, workstation, mobile computing device (such as, a PDA, music player, or phone), embedded system, game console, television, set-top box, or other computing device. Search infrastructure 130 can be any type of search engine including, but not limited to, a general-purpose search engine, special purpose search engine, or other type of search engine that performs query-based searches. Search engine system 108 processes user search query 160 and communicates with search infrastructure 130 to provide search results 190 to user 102. The operation of search engine system 108, according to embodiments, is described further with respect to FIG. 2A and FIG. 2B.

In one example, search engine system 108 and underlying search infrastructure 130 operate on different remote computing devices and communicate with one another over network 106. Alternatively, search engine system 108 and underlying search infrastructure 130 can be combined on one device or coupled locally to one another.

Search engine system 108 and search infrastructure 130 can each be implemented in software, firmware, hardware, or any combination thereof. In one example, not intended to limit the present invention, search engine system 108 can be implemented as a server that can communicate with or is part of a web server (not shown). Similarly, search infrastructure 130 can be implemented as a server that can communicate with or is part of a web server (not shown). In this way, developer 104 or user 102 can communicate with search engine system 108 remotely over the Web through respective browsers running on remote client devices such as client device 103, and developer client 140.

Query Modification

Referring to FIG. 1, query modification may include receiving a search specification 170 from developer 104. Developer 104 has access to a developer client 140. Developer 104 may broadly refer to any user that desires to customize search engine system behavior. Developer client 140 may receive a search specification 170 from developer 104. Developer client 140 may be coupled to search engine system 108 through network 106. Network 106 may transfer search specification 170 from developer client 140 to search engine system 108. Search specification 170 may have a query modification description and a results modification description.

Query modification description may include information on query modification. For instance, this can include query modification parameters. In one embodiment, query modification (QM) parameters can include one or more parameters to add, to restrict, promote, to demote, or to remove search terms.

In another example, query modification description can include information on query modification that is at an even higher-level (such as, an indication of how certain terms or keywords are to be included, excluded, favored, or disfavored to tune search results) which may more easily be specified by developer 104. This information may be later analyzed and automatically converted to QM parameters.

Results modification description may include information on results modification of results returned from search infrastructure 130. In particular, this can include result modification parameters. In one embodiment, results modification (RM) parameters can include one or more parameters to restrict, to promote, to demote or to remove results. In another example, results modification description can include information on results modification that is at an even higher-level (such as, an indication of what websites (e.g. URLs) are to be included, excluded, favored, or disfavored in a search to tune search results) which may more easily be specified by developer 104. This information can then be later analyzed and automatically converted to RM parameters.

According to one feature, not intended to limit the invention, search specification 170 can be provided in a language that is hierarchical, human readable/editable and machine-readable/editable for direct execution by a machine. Such a language can include, but is not limited to, XML (eXtensible Mark-up Language).

User 102 has may access client device 103 to provide query 160 and receive results 190 from search engine system 108. Query 160 can be any type of search query including, but not limited to, a query having one or more terms specified by the user for the search.

In one embodiment, search engine system 108 is adapted to receive a search query that includes one or more terms and may also include one or more labels. The query terms are keywords of interest to the user; the labels are words that the user desires to be found in comments or tags associated with documents matching the query terms. For example, a search query may include a term "camera" and a label "professional review". Search results in a response to a search query are automatically selected to include both the most relevant documents to the query terms and relevant documents that have labels that match the query labels. This is an example and not intended to limit the invention as a search query need not have labels.

Operation of Query Re-Issue System

Figure 2A:
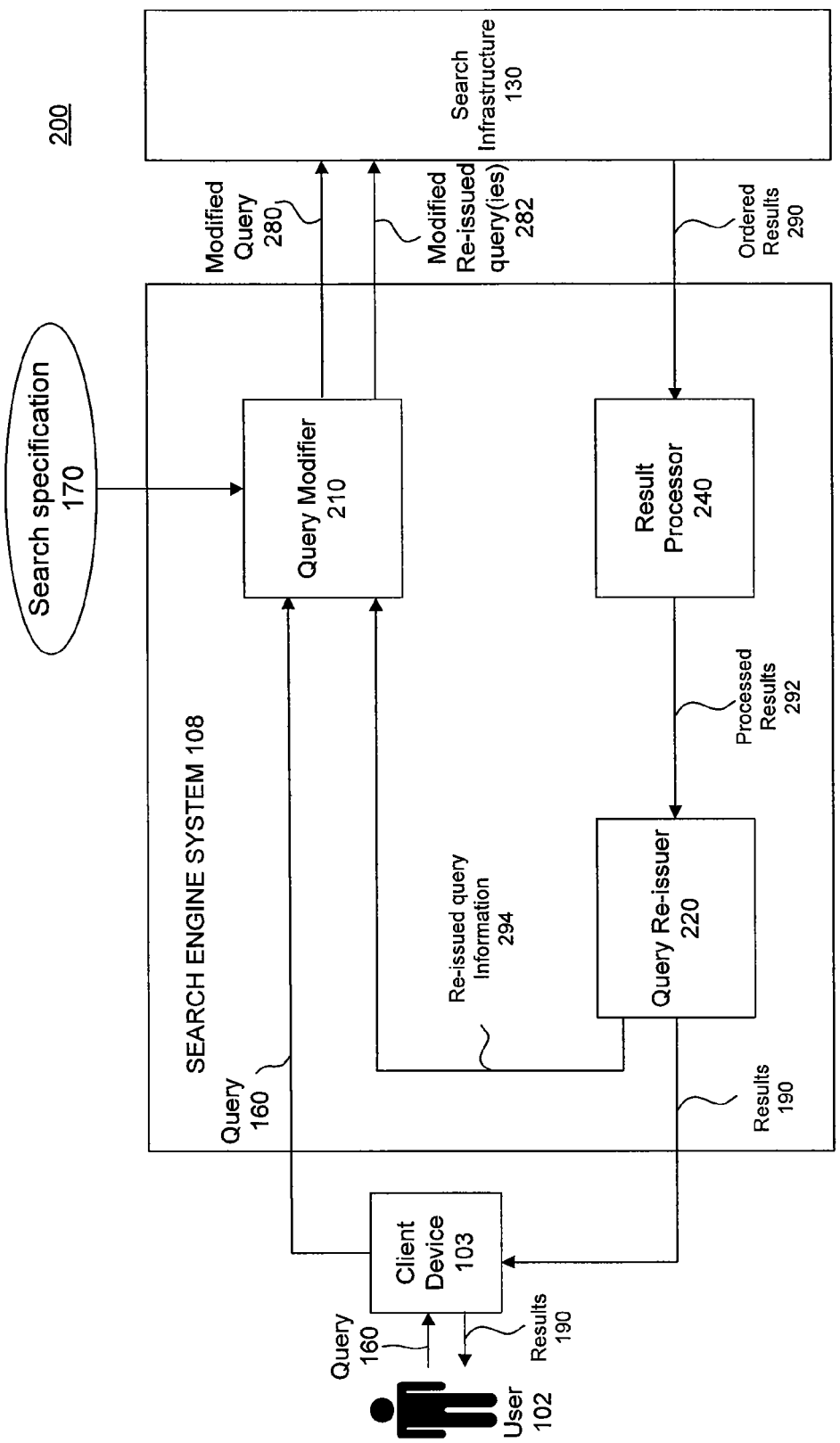
FIG. 2A is a diagram illustrating working of a query re-issue system according to an embodiment of the invention.

FIG. 2A illustrates system 200. System 200 is an embodiment of a system for re-issuing a user query based on estimated quality of search results.

System 200 contains search engine system 108. Search engine system 108 may include query modifier 210, query re-issuer 220 and result processor 240.

Query modifier 210 receives query 160 as an input and initially generates a modified query 280 which is provided to search infrastructure 130. Search infrastructure 130 may return no result, a result or a plurality of ordered results 290. Ordered results 290 may be provided to result processor 240. Result processor 240 may process ordered results 290 to generate processed results 292. Processed results 292 may be provided to query re-issuer 220.

Query re-issuer 220 may generate re-issued query information 294. Re-issued query information 294 may contain an estimate of quality of ordered results 290 and/or an estimate of the number of ordered results 290. In an embodiment, re-issued query information 294 may contain information on the number of times a query has been re-issued and/or any query that may be stored by query re-issuer 220. Re-issued query information 294 is explained further in the application with respect to FIG. 2B.

Query re-issuer 220 may send re-issued query information 294 to query modifier 210. Query modifier 210 may then generate modified re-issued query(ies) 282 and send modified re-issued query(ies) 282 back to search infrastructure 130. In exemplary cases where search infrastructure 130 may not provide any ordered results 290, modified re-issued query 282 may be query 160 or modified query 280. In this way, quality of search results may be improved through query modification and query re-issue.

Figure 2B:
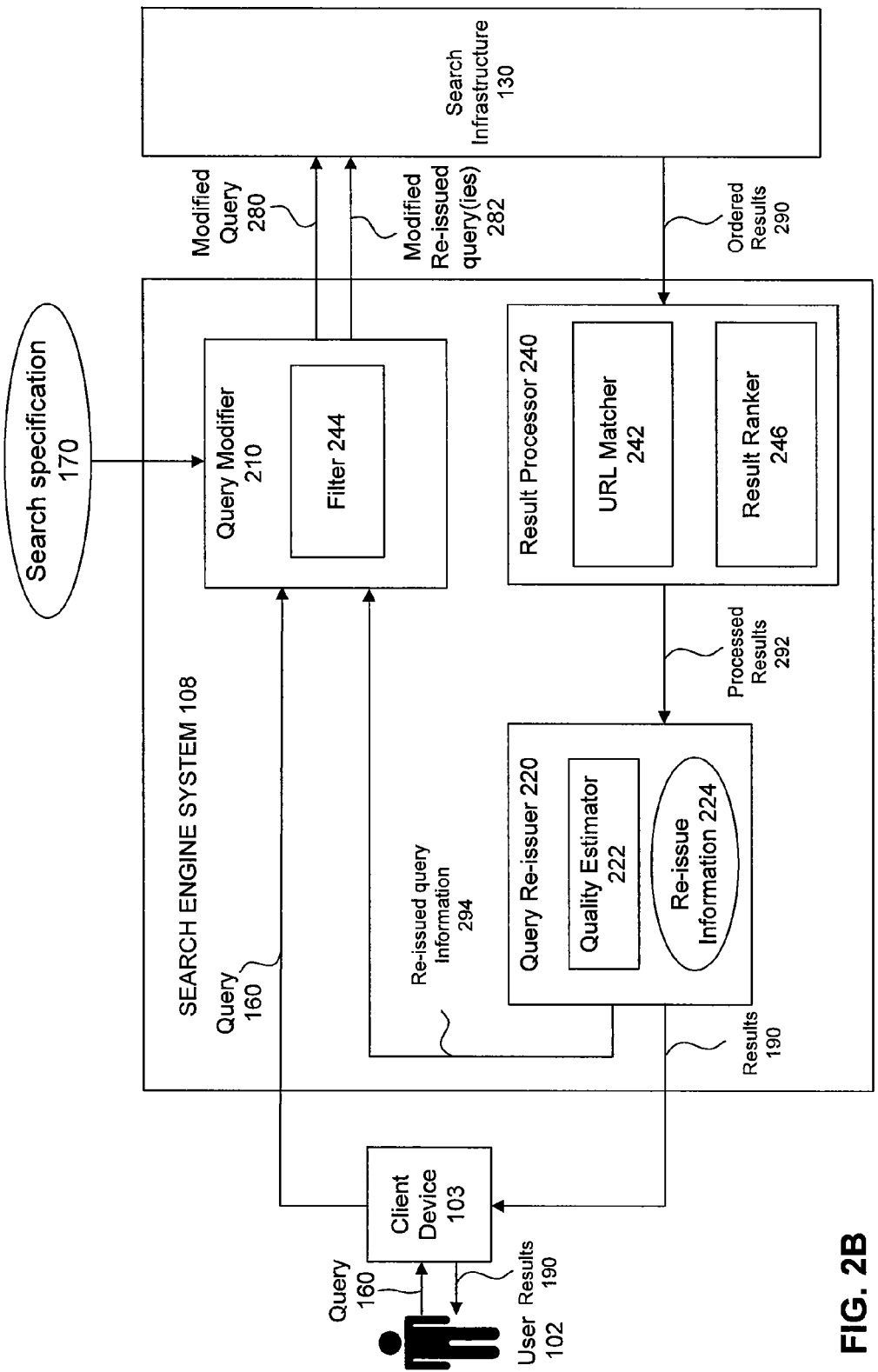
FIG. 2B is a diagram illustrating working of a query re-issue system according to another embodiment of the invention.

FIG. 2B illustrates another exemplary embodiment of a system for re-issuing a user query based on, but not limited to, the estimated quality of search results.

Search engine system 108 may include query modifier 210 that receives a query 160 from user 102 through client device 103. Query modifier 210 may modify query 160 based on search specification 170. Search specification 170 may be provided by developer 104. Search specification 170 may include a query modification description and a results modification description. The query modification description includes information on query modification. The results modification description includes information on results modification. In an embodiment, an approximation of search specification 170 may be used to modify a query. An approximation of search specification 170 may be needed, for example, if the search specification 170 has a large query modification description. Query 160 may be modified by query modifier 210 based on search specification 170 to generate modified query 280. Modified query 280 is provided as an input to the search infrastructure 130.

Filter 244 in query modifier 210 may be used by search infrastructure 130 to test whether the domain of a particular search result is included in the URL patterns for labels that match the query labels. Domain of a search result, for example, may refer to the domain name of a server from which search results are derived. These URL patterns may be provided by search specification 170. Search infrastructure 130 may process query 160, modified query 280 or modified re-issued query(ies) 282 with filter 244.

In one embodiment, filter 244 may be an adaptable and/or a reconfigurable filter. Filter 244 may change (adapt and/or re-configure) depending on the estimated quality of search results. As an example, the size of filter 244 may be increased if the quality of the search results is not good. Furthermore, filter 244 may include one or more filters that affect the retrieval of search results. In one embodiment, filter 244 may be implemented as a Bloom filter. As known to those of skill in the art, a Bloom filter is a space-efficient data structure that is used to probabilistically test whether an element is a member of a set. Bloom filters may be characterized by their error rates. Size of a Bloom filter may depend on these error rates. These examples are illustrative and not intended to limit the invention.

Search infrastructure 130 may return no result, a result or an initial set of ordered results 290. In exemplary cases where search infrastructure 130 may not provide any search results, modified re-issued query(ies) 282 may be query 160 or modified query 280. Ordered results 290 are provided as an input to result processor 240 in search engine system 108. Result processor 240 may include a URL matcher 242 and a result ranker 246. Result processor 240 may further process ordered results 290 to produce a result set in which a selected portion of the documents have labels that match the query labels.

Result ranker 246 may receive ordered results 290 from search infrastructure 130 and ranks them using label matches as weighting factors. Label matches may occur when labels provided with a query by a user match labels that may be included in search results. The ranked results may then be provided to the URL matcher 242.

URL matcher 242 tests whether the domain of a particular search result is included in a set of URL patterns. Domain of a search result, for example, may refer to the domain name of a server from which search results are derived. This set of URL patterns may be provided by search specification 170.

Processed results 292 may be provided to query re-issuer 220. In an embodiment, query re-issuer 220 may store any result from search infrastructure 130 or a plurality of processed results 292. Query re-issuer 220 may comprise of quality estimator 222 and re-issue information 224.

Re-issue information 224 may include information related to the query such as the number of times a query has been re-issued. In another embodiment, re-issue information 224 may include information related to the current state of query re-issuer 220. Current state of query re-issuer 220 may depend on if a query or a plurality of queries have been re-issued or if a query or a plurality of queries are waiting to be re-issued.

Quality estimator 222 may estimate a quality of a search result, a plurality of search results or provide an indication that no results have been retrieved from search infrastructure 130. An estimate of quality may also depend on the number of ordered results 290 that have been retrieved from search infrastructure 130. In cases where search results are retrieved from search infrastructure 130, quality estimator 222 evaluates the quality of the search result based on a comparison of one or a plurality of results retrieved from search infrastructure 130 and search specification 170. Quality estimator 222 may provide query re-issuer 220 with an evaluation or an indication. In an embodiment of the invention, quality estimator 222 may provide an evaluation of quality of processed results 292. This evaluation may include an estimate of the value of re-issuing a query one or more times. The value of re-issuing a query may be based on, but is not limited to, computational cost, network cost and latency. An evaluation of quality may depend on a number or percentage of results that match query terms or labels. Furthermore an evaluation of quality may depend on error rates of filter 244. This value is then used by the query re-issuer 220 to generate re-issued query information 294 and send the re-issued query information 294 to query modifier 210.

Re-issued query information 294 may contain an estimate of quality from quality estimator 222. In an embodiment, re-issued query information 294 may additionally contain re-issue information 224 and/or any query that may be stored by query re-issuer 220.

An estimate of quality contained in re-issued query information 294 may be based on, but is not limited to, computational cost, network cost and latency. An evaluation of quality may also depend on a number or percentage of results that match query terms or labels. In an embodiment, an evaluation of quality may be based on the number of ordered results 290 provided by search infrastructure in response. In one case, search infrastructure 130 may provide no result in response to a query. In another case, search infrastructure 130 may provide a large a plurality of results in response to a user query. In either case, an estimate of quality contained in re-issued query information 294 may indicate the number of search results retrieved from search infrastructure 130 in response to a query.

Query re-issuer 220 may send re-issued query information 294 to query modifier 210. Query modifier 210 may then generate modified re-issued query(ies) 282 and send modified re-issued query(ies) 282 back to search infrastructure 130.

In an embodiment, if the estimated quality of processed results 292 is acceptable, query re-issuer 220 may provide results 190 to user 102. In this way, quality of search results may be improved through query modification and query re-issue.

Figure 3:
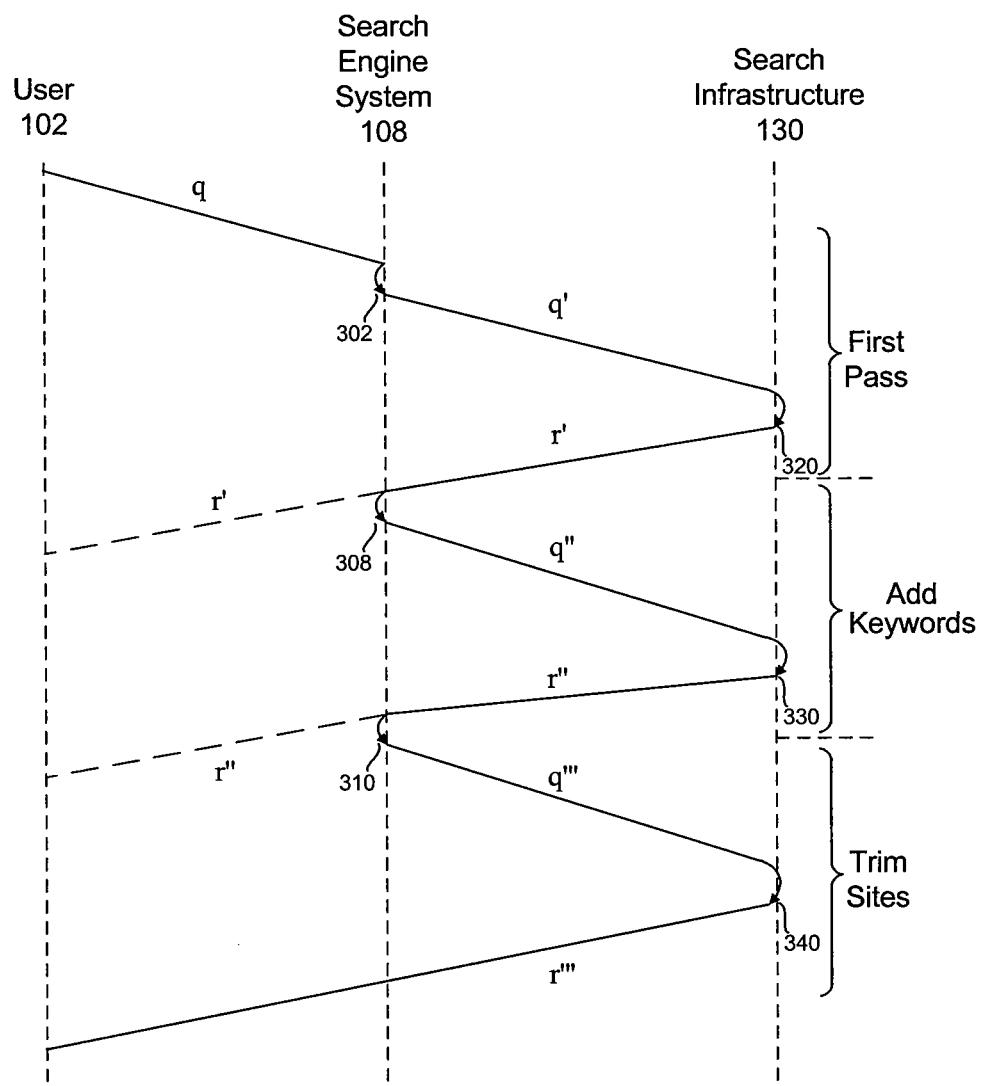
FIG. 3 is a diagram illustrating various stages involved in query modification and re-issue according to an embodiment of the invention.

FIG. 3 is a diagram illustrating various stages that may be involved in query modification and re-issue in an exemplary embodiment of the present invention. In what may be called mode 'First Pass', user 102 sends out a query q to search engine system 108. In an embodiment query q may be query 160 as illustrated in FIG. 2B. At 302, search engine system 108 may modify the query based on the search specification 170, shown in FIG. 2B. Search engine system 108 thus generates a modified query q', which is sent to search infrastructure 130.

Search infrastructure 130 receives the query and generates search results r' at 320. Search results r' are then sent to search engine system 108. In an embodiment of the present invention search engine system 108 may filter, rank and estimate the quality of the results at 308. If the estimated quality of results r' is acceptable, results r' are presented to the user 102.

If the estimated quality of the results r' is unacceptable, then query q' may be modified beginning what may be called as mode 'Add Keywords'. Query q' may be modified by adding terms to query q'. The terms are keywords of interest to the user. In an embodiment, these keywords may be obtained from search specification 170 provided by developer 104. Query modification of query q' may be based on search specification 170, as shown in FIG. 2B.

Query modification of query q' results in query q" being generated by search engine system 108. Query q" is sent to search infrastructure 130. At 330, search infrastructure 330 generates search results r". Search results r" are received by search engine system 108. In an embodiment of the present invention search engine system 108 may filter, rank and estimate the quality of the results at 310. If the estimated quality of results r" is acceptable, results r" are presented to the user 102.

If the estimated quality of the results r" is unacceptable, then query q may be modified beginning what may be called as mode 'Trim Sites'. Query q may be modified by adding 'site:' modifiers to it. 'Site:' modifiers may be terms that are added to query q created by the user. In an embodiment of the invention, 'site:' modifiers may be obtained as fixed size subset of URL patterns that may be included in search specification 170. This results in query q'" being generated at 310.

Query q" is sent to search infrastructure 130. At 340, search infrastructure 330 generates search results r'". In an embodiment, not intended to limit the invention, referring to FIG. 2A and FIG. 2B, results r'" may be provided as results 190 to user 102. In another embodiment, referring to FIG. 2B, query re-issuer 220 may store results r', r" and r'". Quality estimator 222 may provide an evaluation of quality of stored results r', r" and r'". Query re-issuer 220, may use the evaluation to provide either r', r" or r'" in isolation or in any combination as results 190 to user 102.

In one example, a re-issued query includes an initial query further modified to add terms or labels to reduce the number of results. In another example, a re-issued query is based on an initial query that has labels modified to trim sites included in returned search results. In still another example, a re-issued query is based on an initial query.

In this way quality of a search result or a plurality of search results may be improved through query modification and query re-issue.

Method for Query Re-Issue

Figure 4:
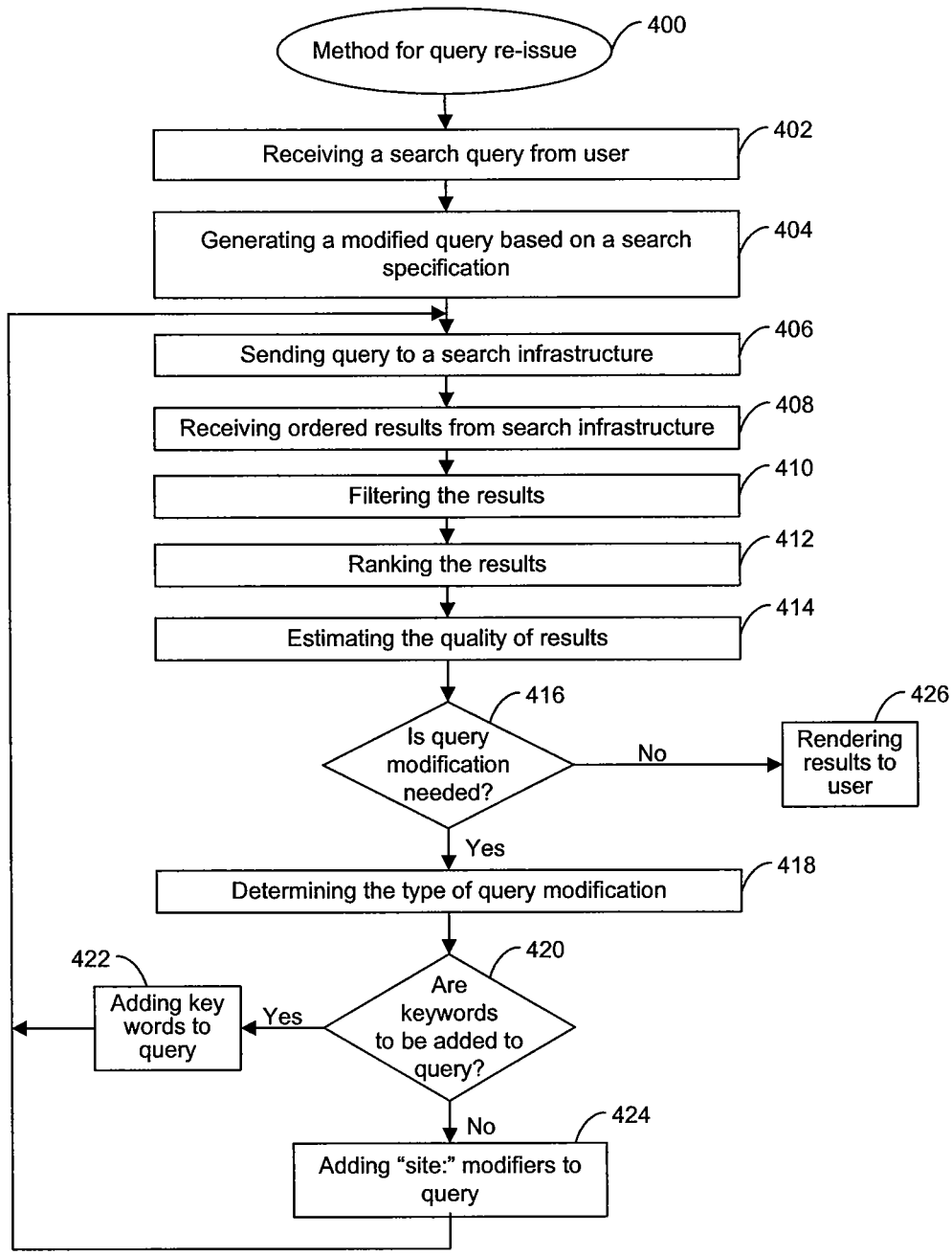
FIG. 4 is a flowchart illustrating a method of query re-issue according to an embodiment of the invention.

FIG. 4 is a flowchart illustrating a method in an embodiment of the present invention. Method 400 begins with receiving a search query from a user at 402. As an example, query 160 may be received by search engine system 108.

At 404, the search specification is used to generate a modified query. A modified query 280, for example, may be generated by query modifier 210.

At 406, a query is sent to a search infrastructure. As an example, modified query 280 may be sent to search infrastructure 130.

At 408, ordered results are received from the search infrastructure. Ordered results 290 may be received, for example, by search infrastructure 130.

At 410, results received by the search infrastructure are filtered. Filtering of results, for example, may be carried out by filter 244.

At 412, filtered results generated in step 410 are ranked. Ranking of filtered results may be carried out by result ranker 246 included in result processor 240.

At 414, the search results are estimated for quality. As an example, processed results 292 may be estimated for quality by quality estimator 222.

At 416, method 400 changes control depending on whether query modification is needed. If query modification is not needed, the results are rendered to the user at 426. Results 190, for example, may be rendered to user 102. If query modification is needed, method 400 determines the type of query modification needed at step 418. As an example, quality estimator 222 may check if query modification is needed and determine the type of query modification.

At 420, method 400 changes control depending on if keywords need to be added to modify the query. If the keywords are to be added to modify the query, key words are added to the query and the modified query is sent back to the search infrastructure at 422. If keywords are not to be added to the query, "site:" modifiers are added to the query and the modified query is sent back to the search infrastructure at 424. As an example, modified re-issued query(ies) 282 may be sent back to search infrastructure 130. Modified re-issued query (ies) 282 may be generated based on modifications of an initial query to tune search results by modifying search terms (add or remove keywords), and/or modifying sites (add or remove labels).

In this way, quality of search results may be improved through query modification and query re-issue.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:
    determining, by a query reissuer that includes one or more processors, a first estimate of quality of a first set of search results that a search engine identifies as responsive to a user search query received from a user device;
    classifying, by query reissuer, the first set of search results that the search engine identifies as responsive to the user search query as unacceptable based at least on the first estimate of quality of the first set of search results;
    in response to classifying the first set of search results that the search engine identifies as responsive to the user search query as unacceptable based at least on the first estimate of quality of the first set of search results, transmitting, by the query reissuer, an instruction to a query reviser to generate a modified search query for submission to the search engine;
    determining, by the query reissuer, a second estimate of quality of a second set of search results that the search engine identifies as responsive to the modified search query;
    classifying, by query reissuer, the second set of search results that the search engine identifies as responsive to the modified search query as acceptable based at least on the second estimate of quality of the second set of search results; and
    in response to classifying the second set of search results that the search engine identifies as responsive to the modified search query as acceptable based at least on the second estimate of quality of the second set of search results, transmitting, by the query reissuer, a subset of the second search results to the client device for output.

2. The method of claim 1, wherein the query reissuer transmits the instruction to the query reviser to generate the modified search query for submission to the search engine in lieu of transmitting a subset of the first set of search results for output at the user device.

3. The method of claim 1, wherein the instruction transmitted by the query reissuer to the query reviser to generate a modified search query for submission to the search engine indicates a number of times that the user search query has been re-issued.

4. The method of claim 1, wherein the instruction transmitted by the query reissuer to the query reviser to generate a modified search query for submission to the search engine indicates a number of queries that are waiting to be re-issued by the query reissuer.

5. The method of claim 1, wherein the instruction transmitted by the query reissuer to the query reviser to generate a modified search query for submission to the search engine indicates the first estimate of quality of the first set of search results.

6. The method of claim 1, wherein the instruction to generate a modified search query comprises an instruction to add one or more keywords to the user search query, or to add a site modifier to the user search query.

7. The method of claim 1, wherein:
    determining the first estimate of quality of the first search results comprises determining a number of search results in the first set of search results; and
    classifying the first set of search results that the search engine identifies as responsive to the user search query as unacceptable comprises determining that the number of search results in the first set of search results satisfies a threshold.

8. The method of claim 1, wherein:
    determining the first estimate of quality comprises determining a number or percentage of the first set of search results whose content matches query terms or labels in the user search query.

9. The method of claim 1, wherein the first set of search results are classified as unacceptable without receiving further input from the user.

10. A non-transitory computer storage device encoded with a computer program, the program comprising instructions that when executed by one or more computers cause the one or more computers to perform operations comprising:
    determining a first estimate of quality of a first set of search results that a search engine identifies as responsive to a user search query received from a user device;
    classifying the first set of search results that the search engine identifies as responsive to the user search query as unacceptable based at least on the first estimate of quality of the first set of search results;
    in response to classifying the first set of search results that the search engine identifies as responsive to the user search query as unacceptable based at least on the first estimate of quality of the first set of search results, transmitting an instruction to a query reviser to generate a modified search query for submission to the search engine;
    determining a second estimate of quality of a second set of search results that the search engine identifies as responsive to the modified search query;
    classifying the second set of search results that the search engine identifies as responsive to the modified search query as acceptable based at least on the second estimate of quality of the second set of search results; and
    in response to classifying the second set of search results that the search engine identifies as responsive to the modified search query as acceptable based at least on the second estimate of quality of the second set of search results, transmitting a subset of the second search results to the client device for output.

11. The device of claim 10, wherein the instruction to generate the modified search query for submission to the search engine is transmitted in lieu of transmitting a subset of the first set of search results for output at the user device.

12. The device of claim 10, wherein the instruction to generate a modified search query for submission to the search engine indicates a number of times that the user search query has been re-issued.

13. The device of claim 10, wherein the instruction to generate a modified search query for submission to the search engine indicates a number of queries that are waiting to be re-issued by the query reissuer.

14. The device of claim 10, wherein the instruction to generate a modified search query for submission to the search engine indicates the first estimate of quality of the first set of search results.

15. The device of claim 10, wherein:
- determining the first estimate of quality of the first search results comprises determining a number of search results in the first set of search results; and
- classifying the first set of search results that the search engine identifies as responsive to the user search query as unacceptable comprises determining that the number of search results in the first set of search results satisfies a threshold.

16. The device of claim 10, wherein:
- determining the first estimate of quality comprises determining a number or percentage of the first set of search results whose content matches query terms or labels in the user search query.

17. The device of claim 10, wherein the first set of search results are classified as unacceptable without receiving further input from the user.

18. A system comprising:
- one or more computers; and
- a computer-readable medium coupled to the one or more computers having instructions stored thereon which, when executed by the one or more computers, cause the one or more computers to perform operations comprising:
  - determining a first estimate of quality of a first set of search results that a search engine identifies as responsive to a user search query received from a user device;
  - classifying the first set of search results that the search engine identifies as responsive to the user search query as unacceptable based at least on the first estimate of quality of the first set of search results;
  - in response to classifying the first set of search results that the search engine identifies as responsive to the user search query as unacceptable based at least on the first estimate of quality of the first set of search results, transmitting an instruction to a query reviser to generate a modified search query for submission to the search engine;
  - determining a second estimate of quality of a second set of search results that the search engine identifies as responsive to the modified search query;
  - classifying the second set of search results that the search engine identifies as responsive to the modified search query as acceptable based at least on the second estimate of quality of the second set of search results; and
  - in response to classifying the second set of search results that the search engine identifies as responsive to the modified search query as acceptable based at least on the second estimate of quality of the second set of search results, transmitting a subset of the second search results to the client device for output.

19. The system of claim 18, wherein the instruction to generate the modified search query for submission to the search engine is transmitted in lieu of transmitting a subset of the first set of search results for output at the user device in response to the user search query.

* * * * *

UNITED STATES PATENT AND TRADEMARK OFFICE
CERTIFICATE OF CORRECTION

| | | |
|---|---|---|
| PATENT NO. | : 8,655,862 B1 | Page 1 of 1 |
| APPLICATION NO. | : 11/874124 | |
| DATED | : February 18, 2014 | |
| INVENTOR(S) | : Riley et al. | |

It is certified that error appears in the above-identified patent and that said Letters Patent is hereby corrected as shown below:

In the Claims:

Column 9, line 22, Claim 1, after "by", please insert -- the --; and

Column 9, line 37, Claim 1, after "by", please insert -- the --.

Signed and Sealed this
Twenty-seventh Day of May, 2014

Michelle K. Lee
*Deputy Director of the United States Patent and Trademark Office*